(12) United States Patent
Häfele

(10) Patent No.: US 7,070,170 B1
(45) Date of Patent: Jul. 4, 2006

(54) CABLE SHEAVE FOR A CABLEWAY SYSTEM

(75) Inventor: Norbert Häfele, Schwarzach (AT)

(73) Assignee: Innova Patent GmbH, Wolfurt (AT)

( * ) Notice: Subject to any disclaimer, the term of this patent is extended or adjusted under 35 U.S.C. 154(b) by 0 days.

(21) Appl. No.: 11/017,613

(22) Filed: Dec. 20, 2004

(30) Foreign Application Priority Data

Jun. 24, 2004 (AT) ............................. A 1074/2004

(51) Int. Cl.
*B66D 3/04* (2006.01)
(52) U.S. Cl. ................... 254/390; 474/174; 474/196
(58) Field of Classification Search ............... 254/389, 254/390; 474/174, 195, 19
See application file for complete search history.

(56) References Cited

U.S. PATENT DOCUMENTS

| | | | | | |
|---|---|---|---|---|---|
| 282,422 | A | * | 7/1883 | Walton | 474/194 |
| 1,400,442 | A | * | 12/1921 | Kilcullen | 474/196 |
| 1,574,332 | A | * | 2/1926 | Wright et al. | 474/187 |
| 1,638,702 | A | * | 8/1927 | O'Brien | 474/168 |
| 1,676,925 | A | * | 7/1928 | Pritchard | 474/170 |
| 1,972,598 | A | * | 9/1934 | Nicht, Jr. | 474/176 |
| 2,536,389 | A | * | 1/1951 | Orzel | 474/170 |
| 2,641,935 | A | * | 6/1953 | Wilken | 474/181 |
| 2,986,136 | A | * | 5/1961 | Wayland | 125/21 |
| 3,172,195 | A | * | 3/1965 | Wentling | 29/892.11 |
| 4,413,981 | A | * | 11/1983 | White et al. | 474/94 |
| 4,486,183 | A | * | 12/1984 | Posiviata et al. | 474/94 |
| 4,704,864 | A | * | 11/1987 | Frotschner et al. | 60/330 |
| 5,076,544 | A | * | 12/1991 | Mueller | 254/332 |

FOREIGN PATENT DOCUMENTS

EP 1 099 880 B1 5/2001

* cited by examiner

*Primary Examiner*—Emmanuel M Marcelo
(74) *Attorney, Agent, or Firm*—Laurence A. Greenberg; Werner H. Stemer; Ralph E. Locher

(57) ABSTRACT

A cable sheave for cableway systems has a hub and a sheave surface extending outwardly from the hub. The sheave surface may be formed of spokes and a cable groove is formed on its periphery. Fastening devices are provided in the sheave surface for rigidly connecting at least two sheave parts to one another to form the complete cable sheave. The parting line(s) is located outside the hub. Here, a first cable sheave part containing the hub and forming the central region of the cable sheave is provided, and at least two further, second cable sheave parts are provided, which parts are of identical size, radially surround the first cable sheave part, are connected rigidly to the first cable sheave part and to the at least one second cable sheave part which is present and by means of which the cable groove is formed.

6 Claims, 3 Drawing Sheets

CABLE SHEAVE FOR A CABLEWAY SYSTEM

BACKGROUND OF THE INVENTION

Field of the Invention

The present invention relates to a cable sheave for cableway systems. The cable sheave has a hub and a sheave surface which surrounds the hub. The device is designed, if appropriate, in the form of spokes, also has a cable groove formed on its circumference. Fastening devices are provided in the sheave surface, by way of which at least three sheave parts can be connected rigidly to one another to form the complete cable sheave, the parting lines being located outside the hub.

Commonly assigned European patent EP 1 099 880 B1 discloses a cable sheave for cableway systems that comprises three cable sheave parts connected rigidly to one another. The subdivision of cable sheaves makes it possible to transport even cable sheaves having very large diameters in containers of standard sizes. A crucial factor of this design was for the parting lines to be located outside the hub.

Since two mutual parallel parting lines were provided in the prior cable sheave, the three cable sheave parts were, however, of lengths which were equal to the diameter of the cable sheave or were only slightly smaller than the same.

SUMMARY OF THE INVENTION

It is accordingly an object of the invention to provide a cable sheave, which overcomes the above-mentioned disadvantages of the heretofore-known devices and methods of this general type. That is, it is an object of the invention to further develop the prior cable sheave, firstly, such that the parting lines run in such a manner that the individual sheave parts have substantially smaller lengths or widths than the diameter of the complete cable sheave and, secondly, the intention is to provide a kit for producing cable sheaves which enables cable sheaves having different diameters to be produced.

With the foregoing and other objects in view there is provided, in accordance with the invention, a cable sheave for a cableway system, comprising:

a central hub;

a first cable sheave part containing the hub and at least two second cable sheave parts connected to the first cable sheave part, the first and second cable sheave parts defining a sheave surface extending from the hub and having a periphery with a cable groove formed therein;

fastening devices in the sheave surface for rigidly connecting at least two of the cable sheave parts to one another along a parting line located outside the hub;

the first cable sheave part containing the hub and forming a central region of the cable sheave;

the at least two second cable sheave parts having a mutually identical size, radially enclosing the first cable sheave part, being rigidly connected to the cable first sheave part and to a respectively other the second cable sheave part, and defining the cable groove.

In one embodiment, the sheave surface is configured with spokes between the hub and the cable groove.

In other words, the objects of the invention are achieved in that a first cable sheave part containing the hub and forming the central region of the cable sheave is provided, and in that at least two further, second cable sheave parts are provided, which parts are of identical size, radially surround the first cable sheave part, are connected rigidly to the first cable sheave part and to the at least one second cable sheave part which is present and by means of which the cable groove is formed.

The radially outer edge of the first cable sheave part is preferably formed with at least two flanges which are arranged in a circular symmetrical manner with respect to the hub, and the second sheave parts are formed with flanges assigned to the flanges of the first cable sheave part. In this case, the first cable sheave part can be formed with at least two radially protruding webs which have equal length and which are formed at their free ends with flanges aligned at right angles to the webs.

The second cable sheave parts are preferably connected to the first cable sheave part along planes which enclose a right angle with respect to the plane of symmetry of the particular second sheave part, which plane of symmetry passes through the hub, and the second cable sheave parts which are situated next to one another are connected to one another along rectilinear planes which pass through the hub. Furthermore, the first cable sheave part can be formed with radially protruding webs, the number of webs being equal to the number of second cable sheave parts, and the second cable sheave parts are formed with webs which extend as a continuation of the radial webs of the first cable sheave part and are likewise radially aligned, and furthermore with peripheral webs which extend in the form of a segment of a circle and the free ends of which, which are situated next to one another, are connected to one another. According to one preferred embodiment, the cable sheave is formed with four second cable sheave parts.

A kit according to the invention for producing cable sheaves with different diameters contains a first cable sheave part having the hub, and at least two groups of second cable sheave parts having the cable groove. The second cable sheave parts of the different groups have different radial lengths, so that differently sized sheaves may be assembled from the kit.

Other features which are considered as characteristic for the invention are set forth in the appended claims.

Although the invention is illustrated and described herein as embodied in a cable sheave for a cableway system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
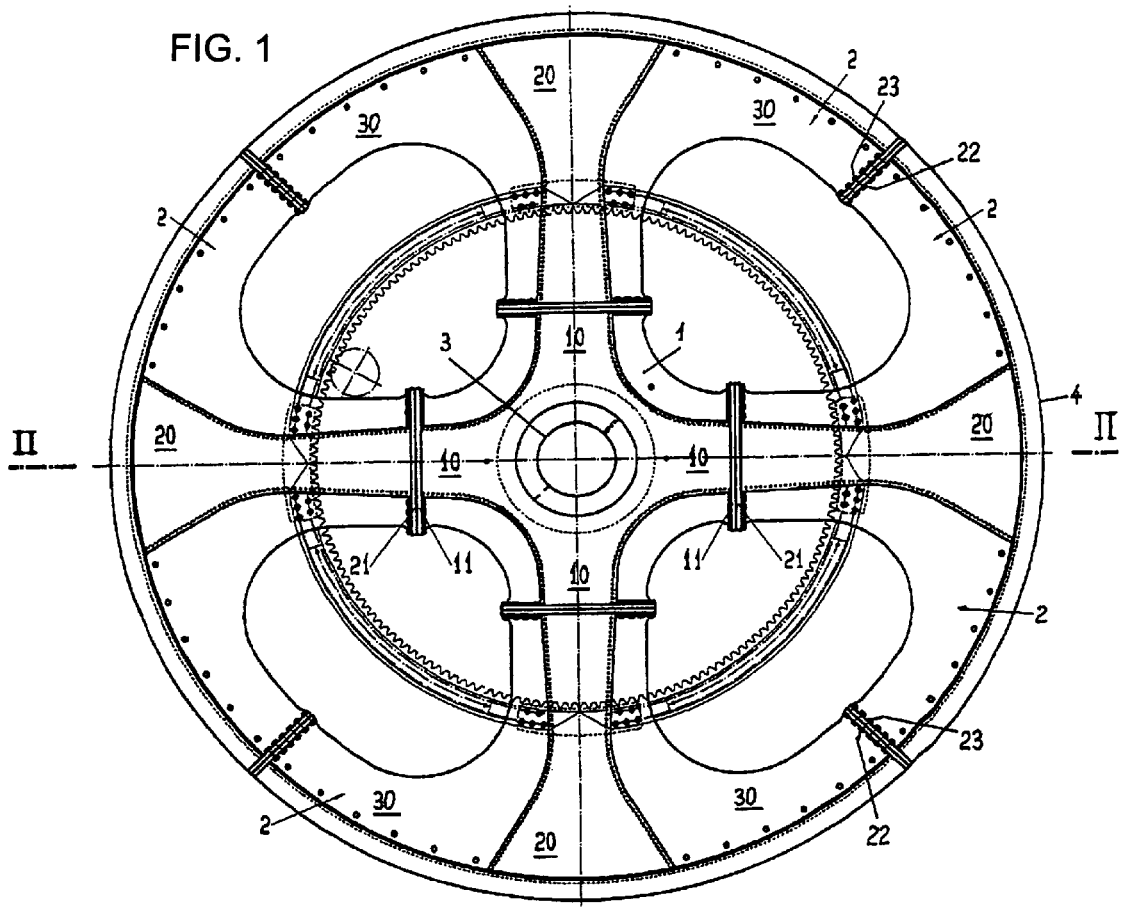
FIG. 1 is a plan view of a first embodiment of a cable sheave according to the invention.
Figure 1A:
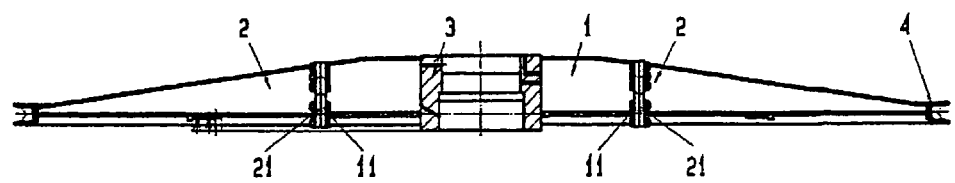
FIG. 1A is a section taken along the line II—II in the cable sheave according to FIG. 1.

Referring now to the figures of the drawing in detail and first, particularly, to FIG. 1 thereof, there is shown a cable sheave with a central first cable sheave part 1 and four second cable sheave parts 2 arranged around the first cable sheave part 1. The parts 2 are in the form of a sector of a circle and are connected rigidly to the first cable sheave part 1 and to one another by way of mutually assigned flanges 11 and 21 or 22 and 23. The hub 3 is located in the center of the first cable sheave part 1 and the cable groove 4 is located on the outer edge of the second cable sheave parts 2.

The first cable sheave part 1 is formed with four radially protruding webs 10, at the free ends of which the flanges 11 are located. The second cable sheave parts 2 are formed with radial webs 20 which are a continuation of the webs 10 and on the inner ends of which the flanges 21 are located and which are adjoined by webs 30 which are in the form of a section of a circle and on the free ends of which are located the flanges 22 and 23 by means of which the second cable sheave parts 2 are connected rigidly to one another with respect to the cable sheave.

The advantage of this design is firstly that the cable sheave parts produced in the factory are of sizes which can be transported in containers, it being possible for them to be assembled to form the cable sheave at the location at which they are required for the cableway system. A further advantage is secondly that for cable sheaves with different diameters use can be made of a central first cable sheave part to which second cable sheave parts located radially on the outside and having different radial dimensions can be fitted. Also, it is possible to manufacture the central part 1 with a high degree of accuracy, which is necessary for integrating the central bearing, and rigidity, while the outer parts 2 may be subject to a lesser degree of accuracy and higher tolerances.

Figure 2:
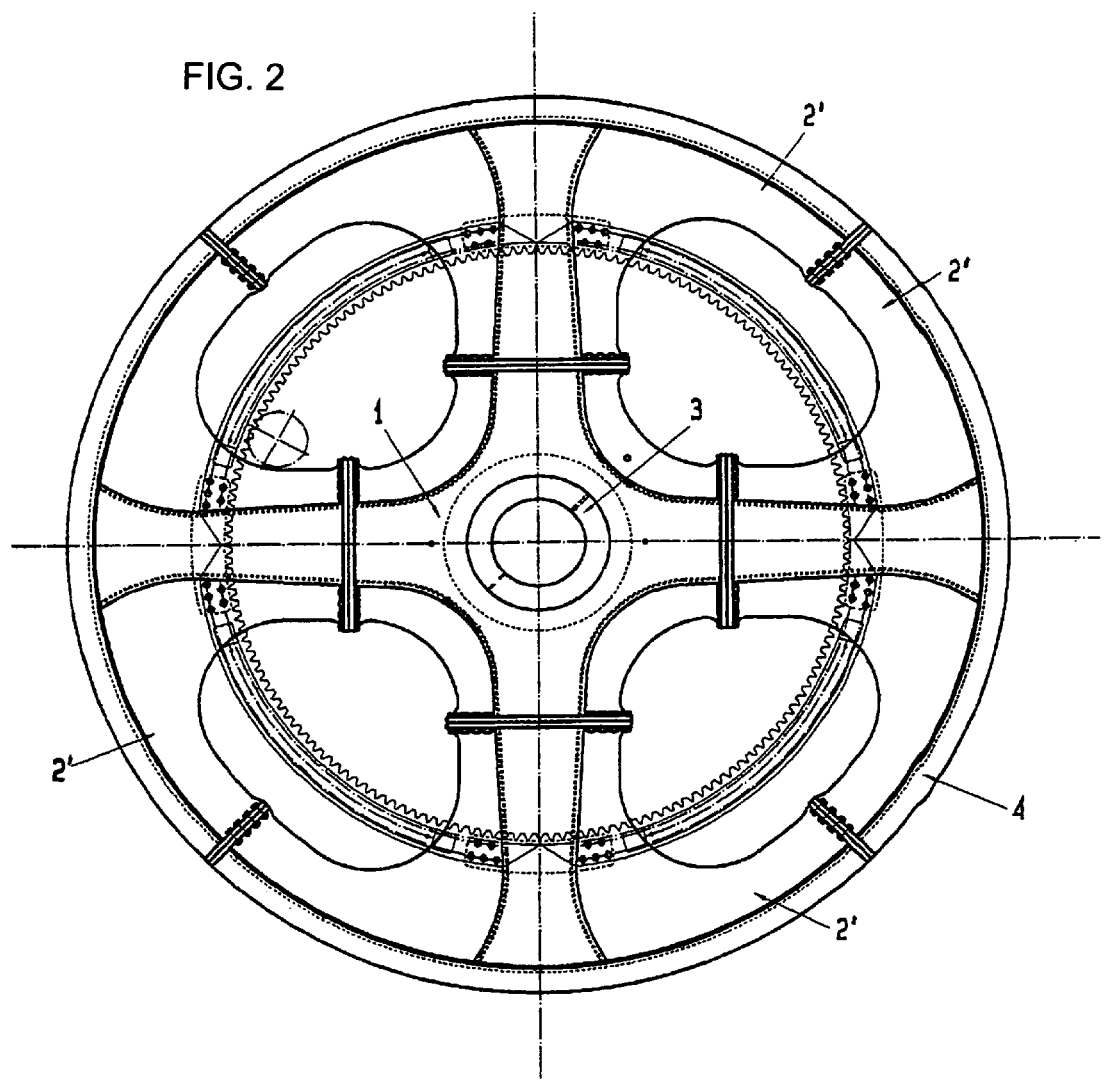
FIG. 2 is a plan view of a second embodiment of a cable sheave according to the invention.

Reference is made for this purpose to the exemplary embodiment which is illustrated in FIG. 2 and in which the central first cable sheave part 1 is the same size as the first cable sheave part 1 of the cable sheave according to FIG. 1, but to which four second cable sheave parts 2' having smaller radial sizes are joined, thus producing a cable sheave having a diameter which is reduced in comparison to the cable sheave according to FIG. 1. The second cable sheave parts 2' form the cable groove 4. A cable sheave having a diameter which is enlarged in comparison to FIG. 1 may also be produced in an analogous manner.

Figure 3:
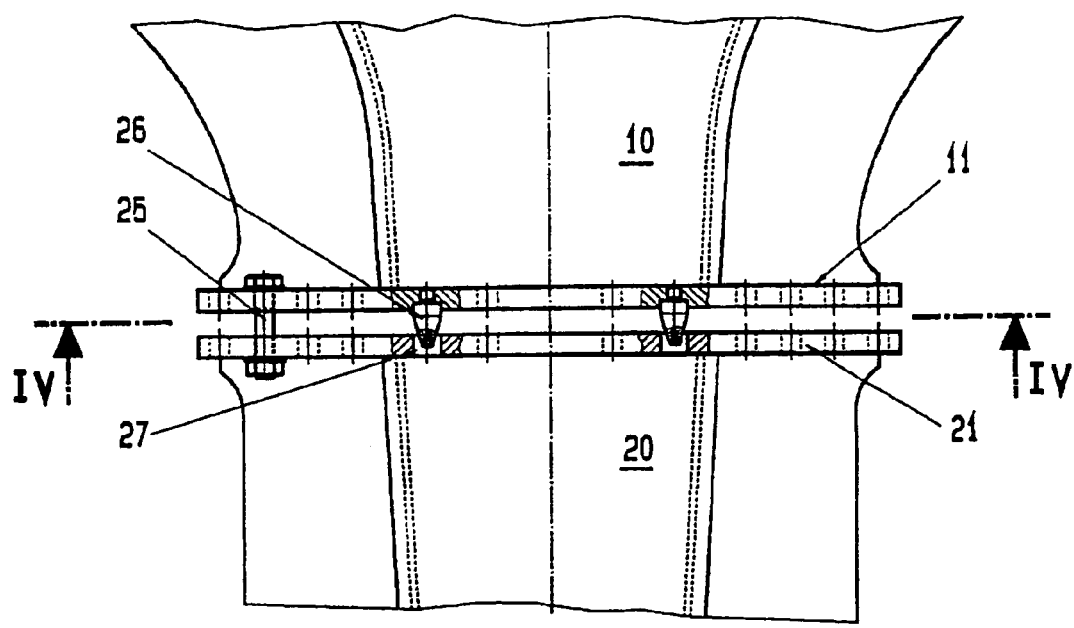
FIG. 3 is a plan view of a detail of the cable sheaves according to FIGS. 1 and 2.
Figure 4:
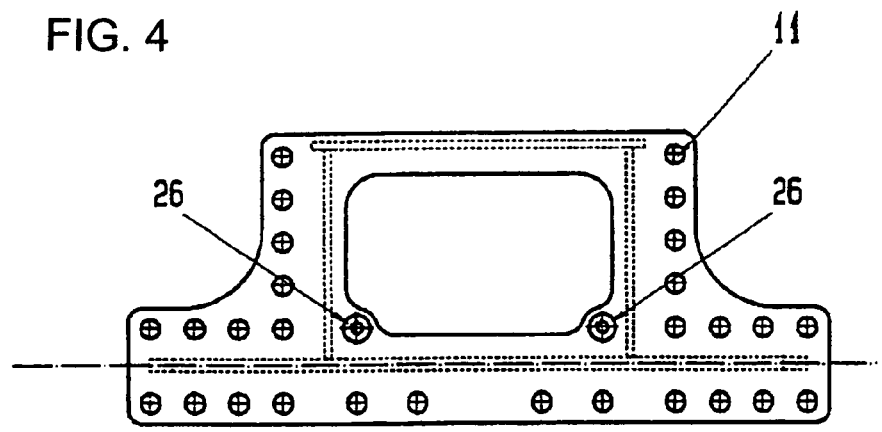
FIG. 4 is a detail of the cable sheaves according to FIGS. 1 and 2, in a view along line IV—IV from FIG. 3.

As is apparent from FIGS. 3 and 4, the flanges 11 and 21 are connected to each other by means of a multiplicity of screw bolts 25. In addition, conical guide bolts 26, to which guide holes 27 are assigned in the flange 21, protrude from the flange 11, as a result of which the installation of the outer cable sheave parts 2 on the central cable sheave part 1 is facilitated.

Cable sheaves of this type can be premanufactured with very large diameters and transported to the location of the cable way system where they are assembled to form the cable sheave. Since the parting lines of the individual cable sheave parts 1 and 2 are located outside the hub 3, the functioning capability of the hub 3 is not impaired. Since, for cable sheaves having different diameters, use is made of a central cable sheave part 1 which is the same size in all of the cable sheaves, a modular system is provided, as a result of which the production costs are reduced.

This application claims the priority, under 35 U.S.C. § 119, of Austrian patent application No. A 1074/2004, filed Jun. 24, 2004; the entire disclosure of the prior application is herewith incorporated by reference.

I claim:

1. A cable sheave for cableway systems, comprising:
    a hub;
    a first cable sheave part containing said hub and at least two second cable sheave parts connected to said first cable sheave part, said first and second cable sheave parts defining a sheave surface extending from said hub and having a periphery with a cable groove formed therein;
    fastening devices in said sheave surface for rigidly connecting at least two of said cable sheave parts to one another along a parting line located outside said hub;
    said first cable sheave part containing said hub and forming a central region of the cable sheave;
    said at least two second cable sheave parts having a mutually identical size, radially enclosing said first cable sheave part, being rigidly connected to said cable first sheave part and to a respectively other said second cable sheave part, and defining said cable groove; and
    wherein a radially outer edge of said first cable sheave part is formed with at least two flanges, disposed in circular symmetry with respect to said hub, and said second sheave parts are formed with flanges assigned to said flanges of said first cable sheave part.

2. The cable sheave according to claim 1, wherein said sheave surface is configured with spokes between said hub and said cable groove.

3. The cable sheave according to claim 1, wherein said first cable sheave part is formed with at least two radially protruding webs of equal length, and said webs are formed, at free ends thereof, with flanges aligned at right angles to said webs.

4. The cable sheave according to claim 1, wherein said second cable sheave parts are connected to said first cable sheave part along planes enclosing a right angle with respect to a plane of symmetry of the respective said second cable sheave part, wherein the plane of symmetry passes through said hub, and wherein said second cable sheave parts that are disposed next to one another are connected to one another along rectilinear planes that pass through said hub.

5. The cable sheave according to claim 1, wherein said at least two second cable sheave parts are four second cable sheave parts.

6. A cable sheave for cableway systems, comprising:
    a hub:
    a first cable sheave part containing said hub and at least two second cable sheave parts connected to said first cable sheave part said first and second cable sheave parts defining a sheave surface extending from said hub and having a periphery with a cable groove formed therein;
    fastening devices in said sheave surface for rigidly connecting at least two of said cable sheave parts to one another along a parting line located outside said hub;
    said first cable sheave part containing said hub and forming a central region of the cable sheave;
    said at least two second cable sheave parts having a mutually identical size, radially enclosing said first cable sheave part, being rigidly connected to said cable first sheave part and to a respectively other said second cable sheave part, and defining said cable groove; and wherein said first cable sheave part is formed with radially protruding webs, a number of said webs being equal to a number of said second cable sheave parts, said second cable sheave parts are formed with webs extending in continuation of said radial webs of said first cable sheave part and are radially aligned, and peripheral webs extend in a form of a segment of a circle and have free ends disposed next to one another are rigidly connected to one another.

* * * * *